Patented May 12, 1936

2,040,256

UNITED STATES PATENT OFFICE 2,040,256

FILLING MATERIAL

Francis R. Grant, Champaign, Ill., assignor to Board of Trustees of the University of Illinois, Urbana, Ill.

No Drawing. Application July 3, 1933, Serial No. 678,924

5 Claims. (Cl. 106—23)

This invention has for its principal object the provision of a composition of matter of improved physical characteristics, and particularly adapted for use as a filler for sewer pipe joints, brick pavements and the like. It will be readily understood, however, that compositions of matter embodying this invention have other valuable applications and uses, such for example, impregnation of fibrous and porous materials to form roofing sheets.

A principal object of the present invention is the provision of a filling material formed mainly of asphalt which will be less susceptible to temperature changes, to impact, and to rapid changes in shape than is asphalt alone.

The filling material produced in accordance with the present invention consists essentially of a mixture of tacky rubber and asphalt, preferably in substantially the percentages by weight of from 0.5% to 15% of rubber and 99.5% to 85% of asphalt. The term "tacky rubber" has long been recognized in the trade as including ordinary raw bark scrap, and crepe, smoked sheets, and other forms of unvulcanized rubber, depolymerized in association with a catalyst, such as copper, brass, oxygen, and other substances, or by exposure to the atmosphere, with or without the application of heat. Unvulcanized rubber may be rendered tacky by heating it to substantially 163° C. under atmospheric conditions, and in the manufacture of rubber articles certain rubbers tend to become tacky as an incident to their commercial treatments and have upon occasion become unfit on this account for the intended uses. Tacky rubber of this sort is more or less a waste product in the factory and is available at low cost for use in the filling materials produced in accordance with the instant invention. Although an asphalt derived from the petroleum industry and approximately of 30 penetration is preferred, a wide range of asphalts may be employed.

The process of producing the filling material is or may be substantially as follows:

The asphalt is melted at an initial temperature of not in excess of 180° C. and the rubber is sprinkled into the melted asphalt in finely divided condition. After the rubber is added to the asphalt the temperature of the mixture is raised, preferably over a period of not less than ten minutes, to 245° C. This temperature is maintained and the mixture constantly stirred until no lumps of rubber are detectable in the mixture.

The amount of rubber employed will vary in accordance with the intended use for the material. If the composition is to be used for the lining of sewer pipe joints, 4.5% of rubber is desirable. When "tacky" rubber is incorporated in the asphalt as hereinbefore described, a product is obtained which has superior properties to those obtained from ordinary rubber or vulcanized rubber and asphalt. The composition described has considerably greater adhesive qualities than the asphalt from which it is made and is less brittle. It does not become brittle at as low as 3° to 10° C. This mixture will withstand temperatures of about 10° C. higher than asphalt alone without becoming unstable and without increasing the pouring temperature by more than 2° C. The rubber renders the mixture less likely than asphalt to break on impact. When the mixture is poured under water or into wet joints, no objectionable foaming results. On this account it is easily possible to fill wet sewer pipe joints by merely pouring the molten compound into them. The filler displaces the water and firmly adheres to all of the pipe surfaces. A composition made in accordance with the foregoing description is not acted upon by weak acids or bases usually contained in sewage. Gasoline and lubricating oils do not attack the described asphalt-rubber mixture as rapidly or as violently as they do asphalt alone. The mixture remains stable at relatively high temperatures and is accordingly not affected by sewage of temperatures reasonably to be expected in the sewage system.

The ductility of the composition is slightly less than that of the asphalt from which it was made. Its penetration should not be more than 2% less than that of the original asphalt. Its adhesion to foreign objects is considerably greater. It is easily distinguishable from asphalt and other bituminous mixtures by the peculiar lines which appear on the surface of the material when it is allowed to cool undisturbed.

Superiority of this product also lies in the fact that it is not charred or burned in the making by over heating as is the case if raw or vulcanized rubber be used. The use of such material, i. e., raw or vulcanized rubber, not only involves heating the rubber to a considerably higher temperature in order to dissolve it but results in a product of radically different characteristics.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The process of producing a filler for sewer pipe joints, brick and other pavements and the like and for other purposes, which comprises heating asphalt to a temperature above that at which rubber becomes tacky, introducing tacky rubber in finely divided condition into said asphalt, and heating the mixture to a still higher temperature.

2. The process of producing a filler for sewer pipe joints, brick and other pavements and the like and for other purposes, which comprises melting asphalt at a temperature not in excess of 180° C., introducing finely divided tacky rubber into the melted asphalt, raising the temperature to substantially 245° C., and agitating the mixture until no lumps of rubber are visible.

3. A composition of matter consisting of asphalt and unvulcanized, tacky rubber of such character and of such proportions as to produce a compound adapted to be used as a filler for brick and other pavements and the like, and characterized by low susceptibility to temperature changes and to impact, and capable of substantial retention of form at temperatures from 70° C. to 110° C., capable of being rendered fluid at temperatures above 150° C. to 175° C., and capable of being poured under water when applied at a fluid temperature.

4. A composition of matter consisting of asphalt and unvulcanized, tacky rubber of such character and such proportions as to produce a compound adapted to be used as a filler in sewer pipe joints and the like, and as a filler for brick and other pavements and the like, and for other purposes, and characterized by low susceptibility to temperature changes, to impact and to rapid change of shape, and capable of being poured under water when applied at a pouring temperature.

5. A composition of matter consisting of asphalt and unvulcanized, tacky rubber in an intimate mixture and in substantially the percentage of 2.75% to 5.75% of tacky rubber and substantially 97.25% to 94.25% of asphalt, and adapted to be used as a filler in sewer pipe joints and the like and as a filler for brick and other pavements and the like, and for other purposes and characterized by low susceptibility to temperature changes and to impact, and capable of being rendered fluid at temperatures above 150° C. to 175° C., and of substantial retention of form at temperatures of 70° C. to 110° C., and capable of being poured under water when applied at a fluid temperature.

FRANCIS R. GRANT.